United States Patent
Wallentin et al.

(10) Patent No.: US 12,526,702 B2
(45) Date of Patent: Jan. 13, 2026

(54) NETWORK NODE, UE AND METHOD FOR HANDLING HANDOVER WITH PARAMETER FOR DERIVING SECURITY CONTEXT

(71) Applicant: Telefonaktiebolaget LM Ericsson (PUBL), Stockholm (SE)

(72) Inventors: Pontus Wallentin, Linköping (SE); Torsten Dudda, Wassenberg (DE); Claes-Göran Persson, Mjölby (SE); Jens Bergqvist, Linköping (SE); Johan Rune, Lidingö (SE); Oscar Ohlsson, Bromma (SE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 483 days.

(21) Appl. No.: 17/428,183

(22) PCT Filed: Feb. 6, 2020

(86) PCT No.: PCT/SE2020/050117
§ 371 (c)(1),
(2) Date: Aug. 3, 2021

(87) PCT Pub. No.: WO2020/167211
PCT Pub. Date: Aug. 20, 2020

(65) Prior Publication Data
US 2022/0124566 A1    Apr. 21, 2022

Related U.S. Application Data

(60) Provisional application No. 62/805,354, filed on Feb. 14, 2019.

(51) Int. Cl.
*H04W 36/00* (2009.01)
*H04W 36/08* (2009.01)

(52) U.S. Cl.
CPC ... *H04W 36/0038* (2013.01); *H04W 36/0094* (2013.01); *H04W 36/08* (2013.01); *H04W 36/00695* (2023.05)

(58) Field of Classification Search
None
See application file for complete search history.

(56) References Cited

U.S. PATENT DOCUMENTS 10,728,757 B2 * 7/2020 Wu ............... H04W 36/08
12,082,064 B2 * 9/2024 Zhang ............ H04W 12/03
(Continued)

FOREIGN PATENT DOCUMENTS

| CN | 101355809 A | 1/2009 |
| CN | 104067648 A | 9/2014 |

(Continued)

OTHER PUBLICATIONS

Intel Corporation, Control plane consideration on simultaneous connectivity, 3GPP TSG RAN WG2 Meeting #106 R2-1906290 (Year: 2019).*

(Continued)

*Primary Examiner* — Luna Weissberger
(74) *Attorney, Agent, or Firm* — Baker Botts L.L.P.

(57) ABSTRACT

A method performed in a User Equipment, UE, for handling handover from a source access node to a target access node is provided. The UE receives (501) a handover command message from the source access node. The handover command message includes parameters required for deriving a security context associated with the target access node. The UE establishes (502) a radio connection with the target access node. When detecting (503) that a security context switching criterion is fulfilled, the UE stops (504) to use a security context associated with the source access node.

24 Claims, 12 Drawing Sheets

(56) References Cited

U.S. PATENT DOCUMENTS

| | | | | |
|---|---|---|---|---|
| 2008/0181411 | A1* | 7/2008 | Norrman | H04W 12/106 |
| | | | | 380/278 |
| 2019/0174571 | A1* | 6/2019 | Deenoo | H04W 76/27 |
| 2020/0275519 | A1* | 8/2020 | Sharma | H04W 12/04 |
| 2022/0386195 | A1 | 12/2022 | Ishii | |

FOREIGN PATENT DOCUMENTS

| | | |
|---|---|---|
| CN | 104782179 A | 7/2015 |
| WO | 2015 042804 A1 | 4/2015 |
| WO | WO2018029932 A1 | 2/2018 |
| WO | 2018 138347 A1 | 8/2018 |
| WO | 2018 141079 A1 | 8/2018 |
| WO | 2019 019736 A1 | 1/2019 |

OTHER PUBLICATIONS

Packet Data Convergence Protocol (PDCP) specification (Release 16) (Year: 2020).*
Examination Report issued by Intellectual Property India for Application No. 202117029621—Mar. 7, 2022.
EPO Communication issued for Application No. 20 704 631.9-1216—May 4, 2023.
3GPP TR 36.881 v14.0.0; Technical Report; 3rd Generation Partnership Project; Technical Specification Group Radio Access Network; Evolved Universal Terrestrial Radio Access (E-UTRA); Study on latency reduction techniques for LTE (Release 14)—Jun. 2016.
3GPP TS 36.300 v14.8.0; Technical Specification; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)—Sep. 2018.
3GPP TS 36.331 v14.9.0; Technical Specification; 3rd Generation Partnership Project; Technical Specification Group Radio Access Network; Evolved Universal Terrestrial Radio Access (E-UTRA); Radio Resource Control (RRC); Protocol specification (Release 14)—Dec. 2018.
3GPP TS 38.300 v15.2.0; Technical Specification; 3rd Generation Partnership Project; Technical Specification Group Radio Access Network; NR; NR and NG-RAN Overall Description; Stage 2 (Release 15)—Jun. 2018.
3GPP TSG-RAN WG2 #100; Reno, Nevada; Source: Ericsson; Title: Conditional Handover (R2-1713606, resubmission of R2-1710850)—Nov. 27-Dec. 1, 2017.
3GPP TSG-RAN WG2 Meeting #103bis; Changdu, China; Title: LTE Mobility Enhancements; Source: Qualcomm Incorporated (R2-1814206)—Oct. 8-12, 2018.
3GPP TSG-RAN WG2#105; Athens, Greece; Source: Ericsson; Title: User plane aspects of Make-Before-Break Handover (Tdoc R2-1901090)—Feb. 25-Mar. 1, 2019.
3GPP TSG-RAN WG2 #105-Bis; Xian, China; Source: Ericsson; Title: User plane aspects of Make-Before-Break handover (Tdoc R2-1903881)—Apr. 8-12, 2019.
3GPP TSG-RAN WG2#106; Reno, Nevada; Source: Ericsson; Title: Make-Before-Break Handover (Tdoc R2-1907316)—May 13-17, 2019.
PCT International Search Report issued for International application No. PCT/SE2020/050117—Mar. 31, 2020.
PCT Written Opinion of the International Searching Authority issued for International application No. PCT/SE2020/050117—Mar. 31, 2020.
Office Action issued for Chinese Patent Application No. 202080014328.2—Oct. 19, 2023.
Search Report issued for Chinese Patent Application No. 2020800143282—Oct. 16, 2023.

* cited by examiner

```
701. The UE 102 receives a handover command message from a source access
node 103 on a source radio connection 107, including parameters for deriving a
security context associated with the target access node 104.
```

↓

```
702. The UE 102 establishes a target radio connection 108 with the target access
node 104.
```

↓

```
703. First security context switching criterion
fulfilled for a bearer?
```
→ No (loop back)

↓ Yes

```
704. For this bearer, the UE 102 starts to use the security context
associated with the target access node 104 and stops using the security
context associated with the source access node 103.
```

↓

```
705. Second security context switching
criterion fulfilled?
```
→ No (loop back)

↓ Yes

```
706. For remaining bearers, the UE 102 starts to use the security context
associated with the target access node 104 and stops using the security
context associated with the source access node 103.
```

Fig. 7

NETWORK NODE, UE AND METHOD FOR HANDLING HANDOVER WITH PARAMETER FOR DERIVING SECURITY CONTEXT

PRIORITY

This nonprovisional application is a U.S. National Stage Filing under 35 U.S.C. § 371 of International Patent Application Serial No. PCT/SE2020/050117 filed Feb. 6, 2020 and entitled "Network Node, UE and Method for Handling Handover with Parameter for Deriving Security Context" which claims priority to U.S. Provisional Patent Application No. 62/805,354 filed Feb. 14, 2019, both of which are hereby incorporated by reference in their entirety.

TECHNICAL FIELD

Embodiments herein relate to a UE, a network node and methods therein. In particular, they relate to handling handover from a source access node to a target access node.

BACKGROUND

A Universal Mobile Telecommunications System (UMTS) is a third generation (3G) telecommunication network, which evolved from the second generation (2G) Global System for Mobile Communications (GSM). Specifications for the Evolved Packet System (EPS), also called a Fourth Generation (4G) network or Long Term Evolution (LTE), have been completed within the 3rd Generation Partnership Project (3GPP) and this work continues in the coming 3GPP releases, for example to specify a Fifth Generation (5G) New Radio (NR) network.

Consider a wireless communication system illustrated in FIG. 1. The wireless communication system may comprise one or more radio access network, where a radio access network 10, may also referred to as a network node, is shown with a user equipment (UE) 12, which communicates with one or multiple access nodes 13-14, using radio connections 17-18. The access nodes 13-14 are connected to a core network node 16. The access nodes 13-14 are part of radio access network 10.

For wireless communication systems pursuant to 3GPP EPS or LTE or 4G standard specifications, such as specified in 3GPP TS 36.300 v14.8.0 and related specifications, the access nodes 13-14 corresponds typically to an Evolved NodeB (eNB) and the core network node 16 corresponds typically to either a Mobility Management Entity (MME) and/or a Serving Gateway (SGW). The eNB is part of the radio access network 10, which in this case is the Evolved Universal Terrestrial Radio Access Network (E-UTRAN), while the MME and SGW are both part of the EPC (Evolved Packet Core network).

For wireless communication systems pursuant to 3GPP 5G System (5 GS) also referred to 5G NR standard specifications, such as specified in 3GPP TS 38.300 v15.2.0 and related specifications, on the other hand, the access nodes 13-14 corresponds typically to an 5G NodeB (gNB) and the core network node 16 corresponds typically to either a Access and Mobility Management Function (AMF) and/or a User Plane Function (UPF). The gNB is part of the radio access network 10, which in this case is the Next Generation Radio Access Network (NG-RAN), while the AMF and UPF are both part of the 5G Core Network (5GC).

To support fast mobility between NR and LTE and avoid change of core network, LTE eNBs can also be connected to the 5G-CN via NG-U/NG-C and support the Xn interface. An eNB connected to 5GC is called a next generation eNB (ng-eNB) and is considered part of the NG-RAN. LTE connected to 5GC will not be discussed further in this document; however, it should be noted that most of the solutions/features described for LTE and NR in this document also apply to LTE connected to 5GC. In this document, when the term LTE is used without further specification it refers to LTE-EPC.

Mobility in RRC_CONNECTED in LTE and NR:

Mobility in Radio Resource Control (RRC)_CONNECTED state is also known as handover. The purpose of handover is to move the UE 12, due to e.g. mobility, from a source access node 13, using a source radio connection 17, to a target access node 14, using a target radio connection 18. The target radio connection 18 is associated with a target cell controlled by the target access node 14. So in other words, during a handover, the UE 12 moves from the source cell to a target cell.

In some cases, the source access node 13 and target access node 14 are different nodes, such as different eNBs or gNBs. These cases are referred to as inter-node handover, inter-eNB handover or inter-gNB handover. In other cases, the source access node 13 and target access node 14 are the same node, such as the same eNB and gNB. These cases are referred to as intra-node handover, intra-eNB handover or intra-gNB handover and cover the case when source and target cells are controlled by the same access node. In yet other cases, handover is performed within the same cell, and thus also within the same access node controlling that cell. These cases are referred to as intra-cell handover.

It should therefore be understood that the source access node 13 and target access node 14 refers to a role served by a given access node during a handover of a specific UE. For example, a given access node may serve as source access node during handover of one UE, while it also serves as the target access node during handover of a different UE. And, in case of an intra-node or intra-cell handover of a given UE, the same access node serves both as the source access node and target access node for that UE.

A UE in RRC_CONNECTED state can be configured by the network to perform measurements of serving and neighbor cells and based on the measurement reports sent by the UE, the network may decide to perform a handover of the UE to a neighbor cell. The network then sends a Handover Command message to the UE, for example, in LTE an RRCConnectionReconfiguration message with a field called mobilityControlInformation and in NR an RRC Reconfiguration message with a reconfigurationWthSync field.

The reconfiguration of the UE is prepared by the target access node upon a request from the source access node, e.g. a Handover Request message sent over X2 interface in case of EUTRA-EPC or Xn interface in case of EUTRA-5GC or NR, and takes into account the existing RRC configuration the UE has in the source cell, which is provided to the target access node in the Handover Request message. The reconfiguration parameters provided by the target access node, such as a target eNB/gNB, contains, for example, information needed by the UE to access the target cell, e.g., random access configuration, a new Cell Radio Network Temporary Identifier (C-RNTI) assigned by the target access node and security parameters enabling the UE to calculate new security keys associated to the target cell so that the UE can send a Handover Complete message on Signaling radio bearer 1 (SRB1), encrypted and integrity protected, based on new security keys upon accessing the target access node.

FIGS. 2a, b and c shows a signaling flow between UE, source access node 13, also known as source gNB or source cell, and target access node 14, also known as target gNB or target cell, during a handover procedure, using 5G/NR as example FIGS. 2a, b and c refer to 3GPP TS 38.300 v15.2.0, FIG. 9.2.3.2.1-1.

FIG. 2a depicts the of the handover preparation a handover procedure, FIG. 2b depicts the handover execution of the handover procedure, and FIG. 2c depicts the handover completion of the handover procedure.

Although the signaling flow in in FIGS. 2 a, b and c show a handover scenario in 5G/NR, there are some general and common principles for UEs performing handover or in more general terms, mobility in RRC_CONNECTED in LTE and NR:

- Mobility in RRC_CONNECTED is Network-controlled as the network has best information regarding current situation such as load conditions, resources in different nodes, available frequencies, etc. Network can also take into account the impact from other UEs served by the network, e.g. from a resource allocation perspective. The Access and AMF may provide the access nodes such as eNBs and gNBs with mobility-control information, as in step 0 in FIG. 2a.
- Network prepares a target access node 14 before the UE accesses that node. Source access node 13 provides the UE with the RRC configuration to be used in the target access node 14, including SRB1 configuration to be used when the UE sends the HO Complete message, also known as the RRCConnectionReconfiguration-Complete message in LTE, on the target radio connection 18 to the target access node 14.
- A new C-RNTI is allocated by the target access node 14 and provided to the UE 12 in the Handover Command message sent on the source radio connection 17 from the source access node 13. The UE 12 identifies itself by conveying the C-RNTI in MSG3 in the HO Complete message. Hence, there is no need for UE context fetching in the target node, unless a failure occurs.
- To speed up the handover, source access node 13 provides the UE 12 with information how to access the target access node 14 e.g. RACH configuration, so the UE 12 does not have to acquire SI prior to the handover.
- The UE 12 may be provided with contention-free random access (CFRA) resources, i.e. in that case the target access node 14 identifies the UE from the preamble in MSG1. The principle is that the handover procedure can always be optimized with network pre-allocated resources.
- Security is prepared before the UE 12 accesses the target access node 14 i.e. keys must be refreshed before sending the encrypted and integrity protected HO Complete message so that the UE 12 can be verified to the target access node 14.
- Both full and delta reconfiguration are supported so that the HO command can be minimized.

RLM in LTE and NR:

Radio Link Monitoring (RLM) is procedure in RRC_CONNECTED to keep track of the radio link condition so that appropriate steps can be taken if Radio Link Failure (RLF) is declared.

In one example of radio link monitoring procedure which is used in both LTE and NR, the physical layer in the UE continuously monitors the e.g. downlink quality of received signals from the access node and at a certain criterion, the physical layer provides an "out-of-sync" indication to the RRC layer in the UE.

Upon a certain number of consecutive "out-of-sync" indications, known as the parameter N310, the RRC layer starts a timer, known as T310. If the physical layer then provides a certain number of "in-sync" indications while this timer is running, the UE has recovered from a sync problem and stops the timer. If the timer expires, this triggers a RLF condition, which typically leads to an RRC connection re-establishment.

Mobility Enhancements for LTE and NR and Make-Before-Break:

Two new work items for mobility enhancements in LTE and NR have started in 3GPP in release 16. The main objectives of the work items are to improve the robustness at handover and to decrease the interruption time at handover.

Handover interruption time is typically defined as the time from the UE stops transmission/reception with the source access node 13 (eNB/gNB) until the target access node 14 (eNB/gNB) resumes transmission/reception with the UE.

In LTE pre-Rel-14, according to 3GPP TR 36.881 v14.0.0, the handover interruption time is at least 45 ms. In LTE and NR, different solutions to decrease the handover interruption time have since then been discussed. Improvements are driven for example by new service requirements on low latency, e.g. aerial, industrial automation, industrial control, for which low interruption time shall be guaranteed.

As an example of one such improvement, Make-Before-Break (MBB) was introduced in LTE Rel-14 in purpose to shorten handover interruption time as close to Oms as possible. FIG. 3a shows procedure for MBB. FIG. 3a refers to 3GPP TS 36.300 v14.8.0, FIG. 10.1.2.1.1-1.

MBB as specified in LTE Rel-14, 3GPP TS 36.300 v14.8.0 and TS 36.331 v14.9.0, has some known limitations:

- The connection to the source access node 13 is only maintained until the UE executes initial uplink transmission in the target access node 14, i.e. the UE releases the connection to the source cell before the connection to the target access node is ready for packet transmission/reception. User data to/from old cell stops at reference 301 and User data to/from new cell starts at reference 302.
- 3GPP TS 36.300 and TS 36.331 do not clearly specify when UE can switch from Source access node 13 to Target access node 14 for DL/UL data transfer. As defined in 3GPP TS 36.300, it is up to UE implementation when to stop the uplink transmission/downlink reception with the source cell and when to initiate re-tuning for connection to the target cell.
- It is designed for UEs with single radio transmit and receive (Tx/Rx) chain. Such a UE can typically not maintain simultaneous DL/UL data transfer with Source access node and at the same time switch from Source access node 13 to Target access node 14 without any user plane interruption.
- There is no clear mechanism defined for how long Source access node 13 will continue to transfer DL data during HO execution. In worst case the Source access node 13 will continue to transfer DL data to the UE until it receives the UE Context Release message as shown in step 17 in FIG. 3a.
- How DL Data transfer can be handled without interruption and reliably during PDCP Anchor switch from Source access node 13 to Target access node 14 is not specified.
- HO reliability & robustness enhancements are not considered.

It is limited to intra-frequency, synchronous and same bandwidth carrier frequency for both source access node 13 and target access node 14.

Improvements to the LTE Rel-14 make-before-break handover have been proposed in the past. Some of these improvements would benefit from UEs with dual Tx/Rx radio chains such a UE has dual radio transmitters and receivers and associated dual user plane protocol stacks. One example of such proposed improvement is shown in FIGS. 3 b and c. FIGS. 3 b and c refer to R2-1814206, LTE Mobility Enhancements, Qualcomm Incorporated, 3GPP TSG-RAN WG2 Meeting #103bis, Chengdu, China, Oct. 8-12, 2018.

Some highlights in this solution are:

At step 7, upon receiving the 'make-before-break' HO indication in the RRC Connection Reconfiguration Request message, UE 12 maintains the connection to the source cell 13 even while establishing the connection to the target access node 14. That is, the UE 12 can send and receive data via the source access node 13 between step 7-10 without any interruption. And after step 10, the UE 12 has the target link available for data Tx/Rx similar to the regular HO procedure.

Once the connection setup with the target access node 14 is successful, i.e. after sending the RRC Connection Reconfiguration Complete message in step 10, the UE 12 maintains one common PDCP entity but keeps dual RLC/MAC/PHY stacks, one for the source access node 13 link and one for the target access node 14 link. After step 10, the UE 12 transmits the UL data to the target access node 14 similar to the regular HO procedures using the target access node 14 security keys. There is no need for UL data duplication to both nodes and it avoids UE Power splitting between 2 nodes and also simplifies UE implementation.

After, the UE 12 sends the RRC Connection Reconfiguration Complete message, Target access node 14 will send X2 data forwarding indication, see step 11, to source access node 13 and Source access node PDCP PDUs will be duplicated towards Target access node 14 via X2 UP. Target access node PDCP will encrypt data received from Source access node 13. The UE 12 may then receive DL data from both the source and target access nodes 13, 14 simultaneously before source access node 13 connection is released. Optionally, based on network implementation, duplicating DL data transmission i.e. sending the same PDCP PDUs from both nodes, during HO execution provides helps to reduce DL data interruption during HO execution. It is also helpful for additional link reliability and reduces latency of DL data delivery i.e. when one link is poor and without waiting for re-transmission delay, the other link can deliver the same data faster without re-transmission.

The UE 12 needs to maintain a security context for both source access node 13 and target access node 14 until the source access node release request is received, see step 17a. the UE 12 can differentiate the security key to be used for a PDCP PDU based on the RLC/MAC/PHY stack from which the PDU is received.

The UE 12 releases the source radio connection 17 with the source access node 13 as per the notification from the target access node 14, see step 17a.

In the existing solutions, for example in the enhanced make-before-break solution as illustrated in FIGS. 3b and 3c, the UE 12 needs to maintain the security context e.g. encryption and integrity protection keys, for both source access node 13 and target access node 14 until the source access node release request, UE Context Release message in step 17a, is received.

This has the following drawbacks:

Unwanted UE complexity as it in practice would imply that the UE 12 has to maintain two PDCP protocol contexts, one for the source access node 13 and one for the target access node 14, including two security contexts, simultaneously.

Since the target access node 14 needs to send an explicit release request message to the UE 12 for release of the source access node 13, the UE 12 needs to keep the connection to the source access node 13 longer than really necessary, resulting in higher usage of radio resources and power consumption in both the network and the UE 12.

SUMMARY

Therefore it is an object of embodiments herein to provide an improved method for handling handover.

According to an aspect of embodiments herein, the object is achieved by a method performed in a User Equipment, UE, for handling handover from a source access node to a target access node. The UE receives a handover command message from the source access node. The handover command message includes parameters required for deriving a security context associated with the target access node. The UE establishes a radio connection with the target access node. When detecting that a security context switching criterion is fulfilled, the UE stops to use a security context associated with the source access node.

According to another aspect of embodiments herein, the object is achieved by a method performed in a network node for assisting a User Equipment, UE, to handover from a source access node to a target access node. The network node sends a message to the UE comprising configuration data for instructing the UE to apply one or subset out of a set of criterion for triggering switch of security context.

According to another aspect of embodiments herein, the object is achieved by a User Equipment, UE, for handling handover from a source access node to a target access node. The UE is configured to:

Receive a handover command message from the source access node; wherein the handover command message is adapted to include parameters required for deriving a security context associated with the target access node;

establish a radio connection with the target access node;

when detecting that a security context switching criterion is fulfilled, stop to use a security context associated with the source access node.

According to another aspect of embodiments herein, the object is achieved by a network node for assisting a User Equipment, UE, to handover from a source access node to a target access node. The network node is configured to send a message to the UE comprising configuration data for instructing the UE to apply one or a subset out of a set of criterion for triggering switch of security context.

BRIEF DESCRIPTION OF THE DRAWINGS

Examples of embodiments herein are described in more detail with reference to attached drawings in which:

FIG. 7 is a flow chart illustrating a method performed in UE according to yet another embodiment herein.

DETAILED DESCRIPTION

Figure 1A:
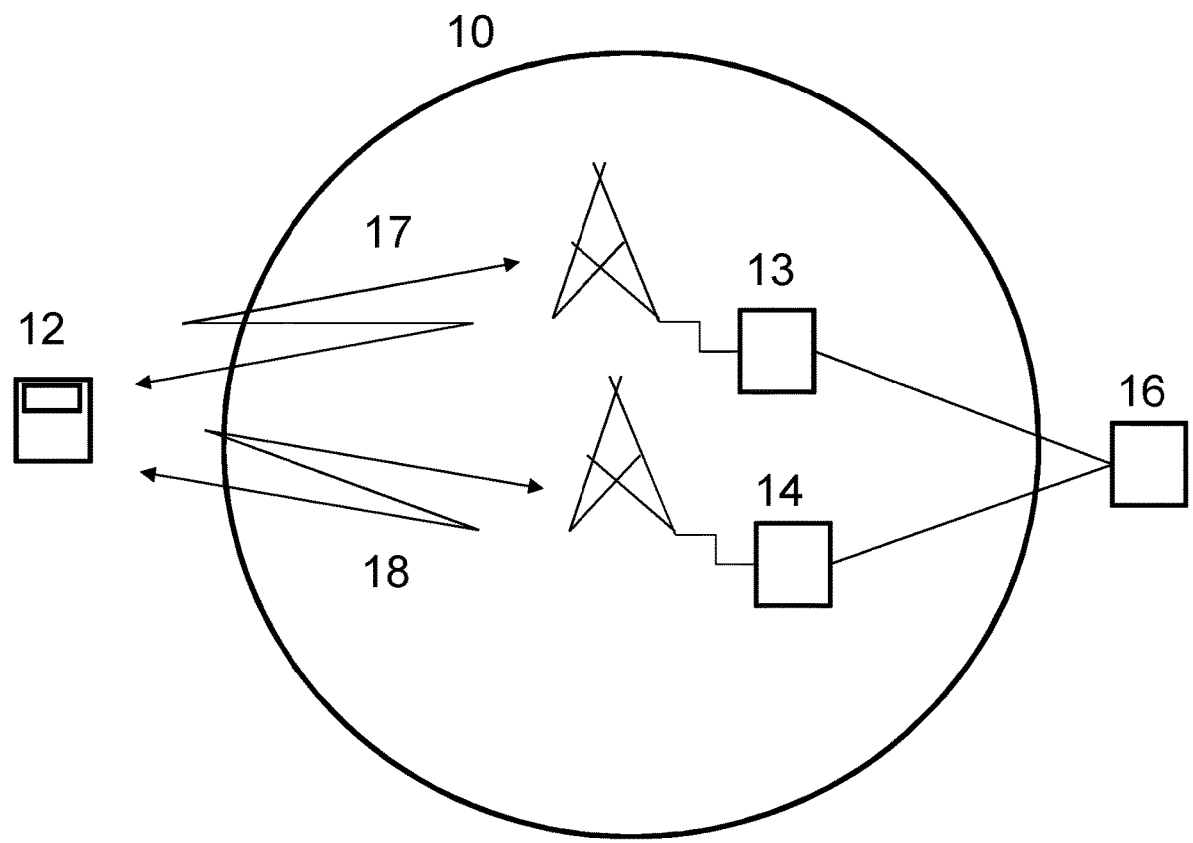
FIG. 1 illustrates a wireless communication network in which embodiments herein may be implemented.
Figure 2A:
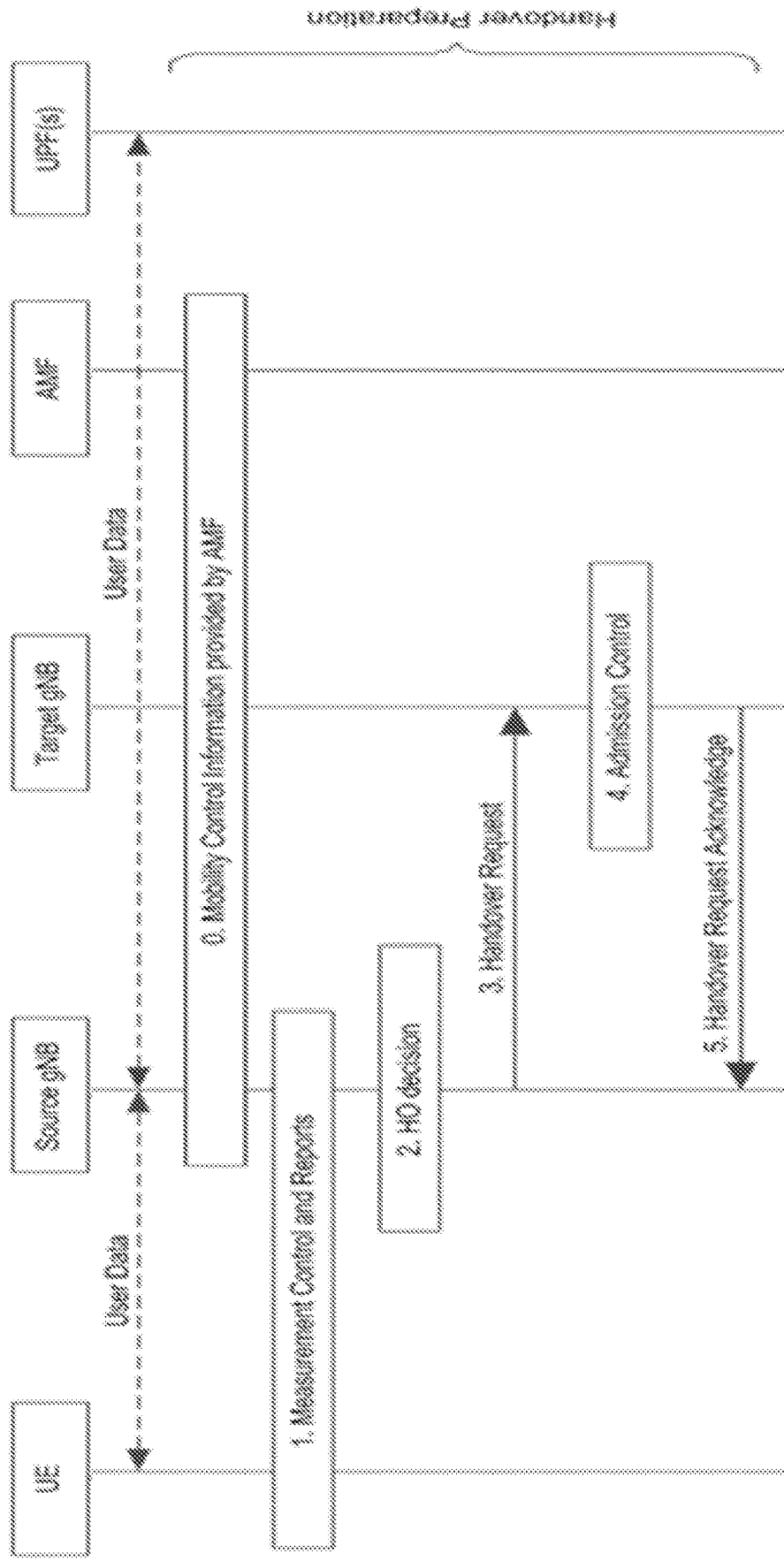
FIGS. 2 a, b and c, illustrate handover signalling in 5G/NR.
Figure 2B:
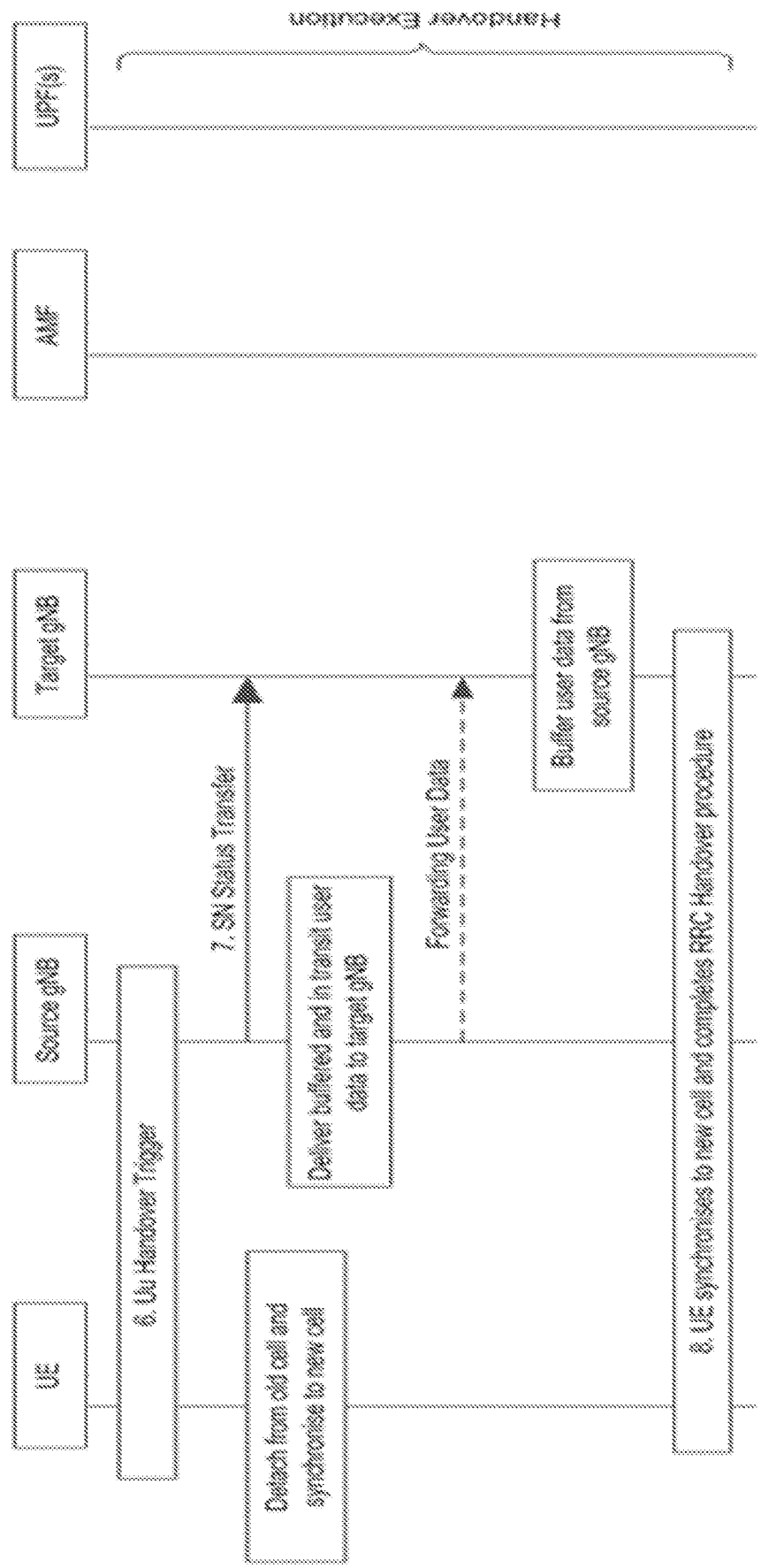
Figure 2C:
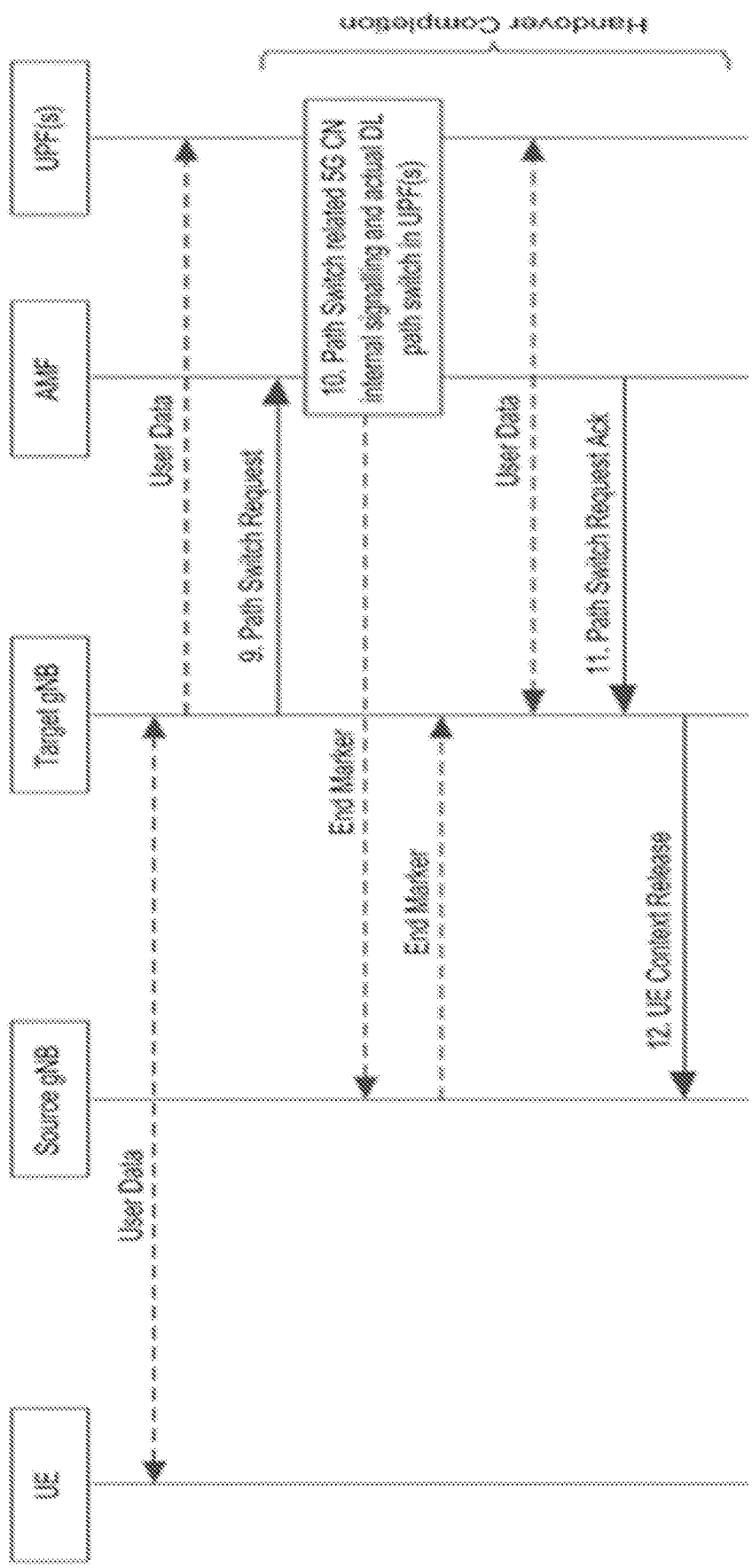
Figure 3A:
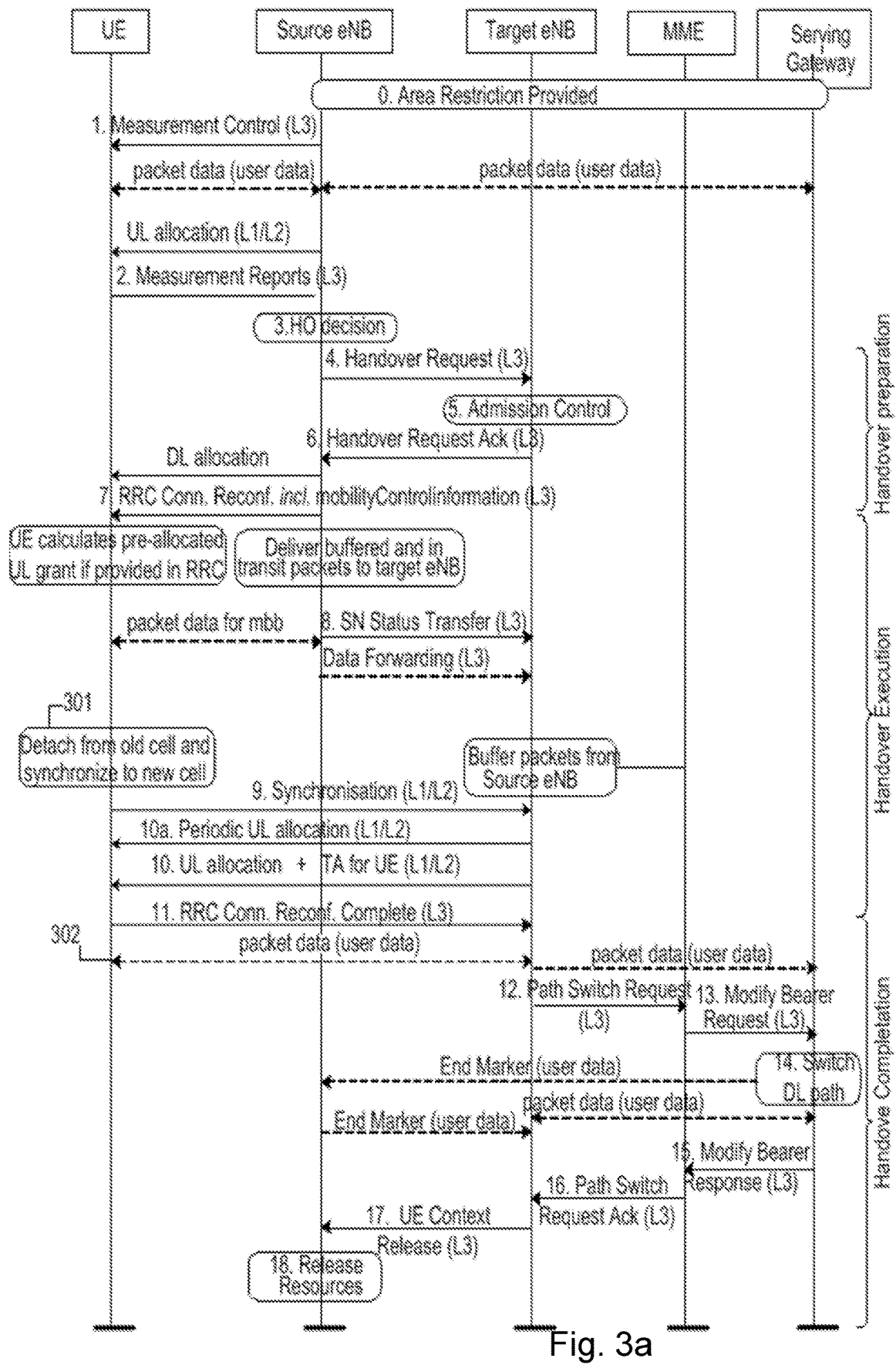
FIG. 3a illustrates Make-before-break signalling LTE.
Figure 3B:
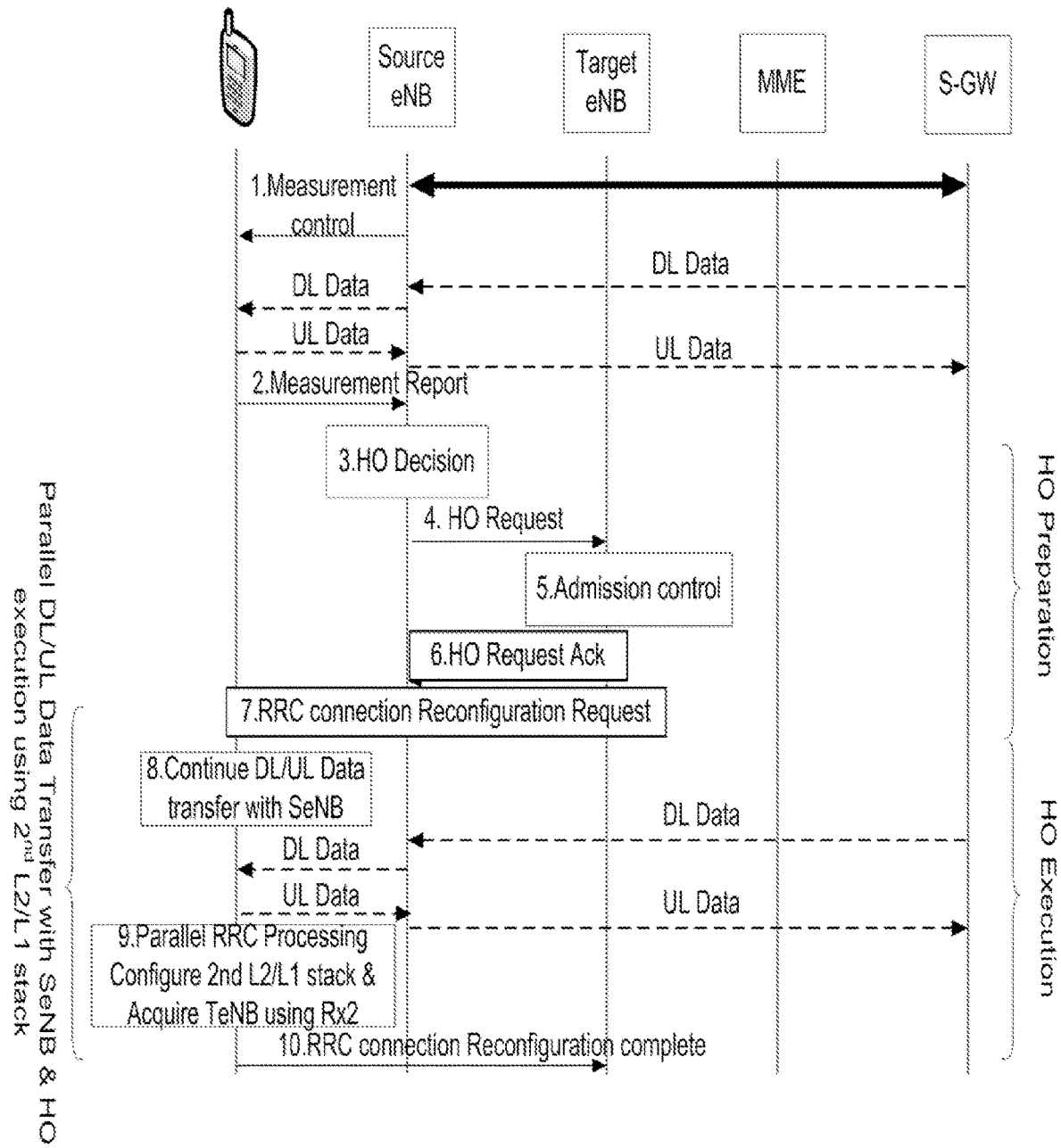
FIG. 3b illustrates examples of embodiments of MBB handover improvement for LTE.
Figure 3C:
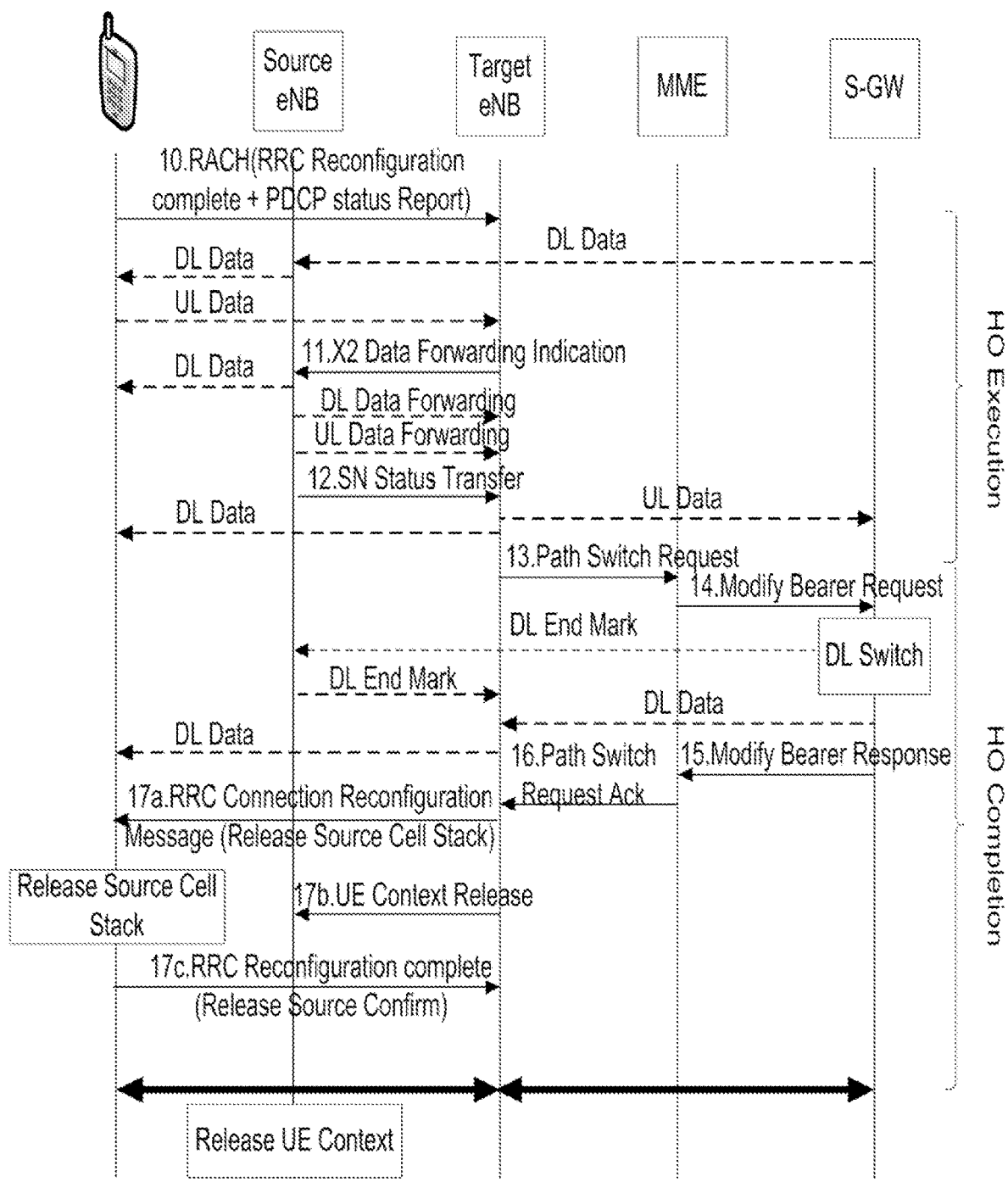
FIG. 3c illustrates examples of embodiments of MBB handover improvement for LTE.
Figure 4:
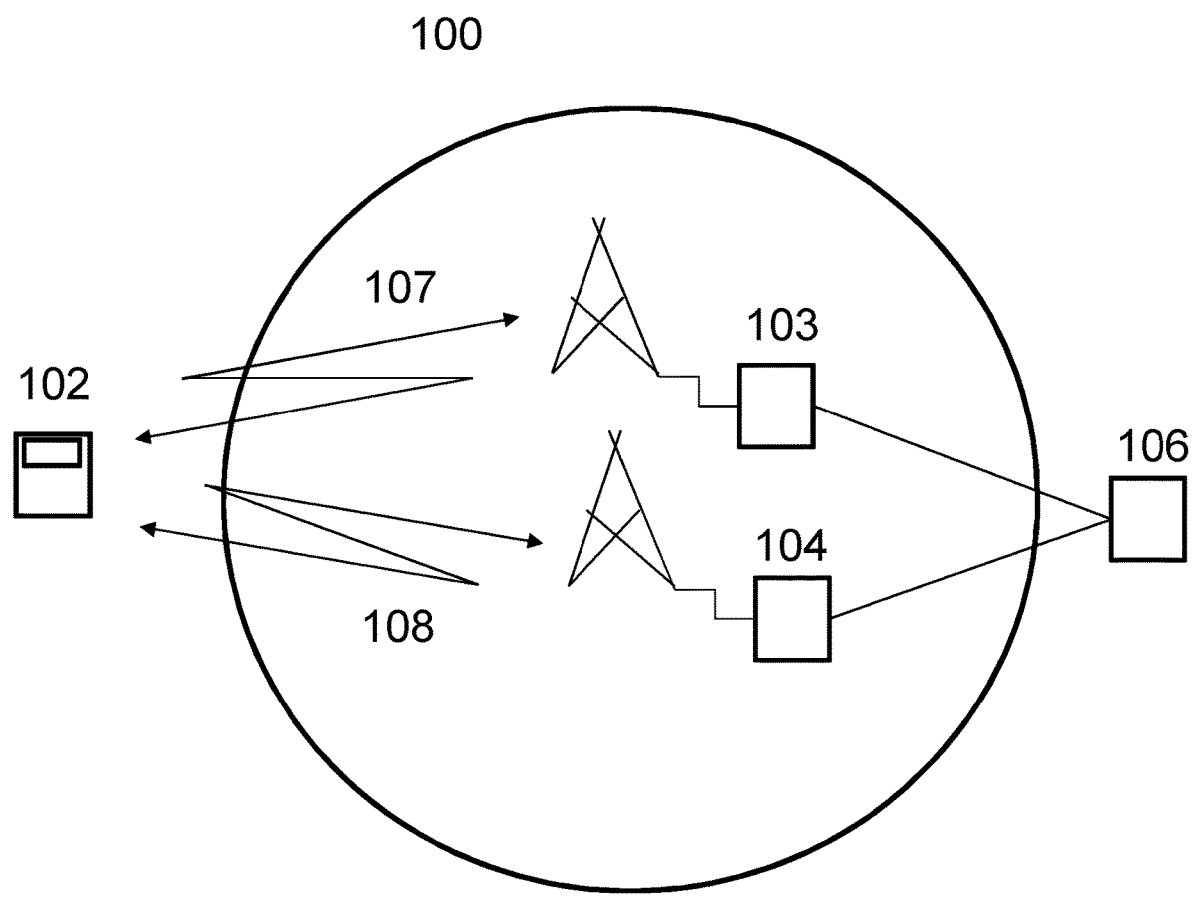

FIG. 4 depicts a wireless communication system wherein embodiments herein may be implemented. The wireless communication system may comprise one or more radio access networks, where a radio access network 100 is shown with a user equipment (UE) 102, which communicates with one or multiple access nodes 103-104, using radio connections 107-108. The access nodes 103-104 are connected to a core network node 106. The access nodes 103-104 are part of radio access network 100.

For wireless communication systems pursuant to 3GPP EPS or LTE or 4G standard specifications, such as specified in 3GPP TS 36.300 and related specifications, the access nodes 103-104 corresponds typically to an Evolved NodeB (eNB) and the core network node 106 corresponds typically to either a Mobility Management Entity (MME) and/or a Serving Gateway (SGW). The eNB is part of the radio access network 100, which in this case is the E-UTRAN (Evolved Universal Terrestrial Radio Access Network), while the MME and SGW are both part of the EPC (Evolved Packet Core network).

For wireless communication systems pursuant to 3GPP 5G System (5 GS) also referred to 5G NR standard specifications, such as specified in 3GPP TS 38.300 and related specifications, on the other hand, the access nodes 103-104 corresponds typically to an 5G NodeB (gNB) and the core network node 106 corresponds typically to either a Access and AMF and/or a User Plane Function (UPF). The gNB is part of the radio access network 100, which in this case is the Next Generation Radio Access Network (NG-RAN), while the AMF and UPF are both part of the 5G Core Network (5GC).

In some embodiments, when the UE 102 detects that a security context switching criterion is fulfilled, the UE 102 starts to use the security context, e.g. ciphering and integrity protection keys, for the target access node 104.

An example of a security context switching criterion is when the UE 102 has received a first valid data packet from the target access node 104. A first valid data packet may be typically a downlink Packet Data Convergence Protocol (PDCP) PDU received from the RLC layer entity associated with the target access node 104.

In another embodiment, the UE 102 starts using the security associated with the source access node 103 for the target access node 104 as soon as the target radio connection 108 is established. Then, when the UE 102 detects that a security context switching criterion is fulfilled, the UE 102 stops using the security context associated with the source access node 103.

In yet another embodiment, there is a first security context switching criterion associated with each bearer and a second security context switching criterion associated with all the bearers.

In yet another embodiment, the security context switching criteria may be that the first of a set of criteria, which may be referred as sub-criteria, is fulfilled.

According to embodiments herein, it is possible for the UE 102 to have a single PDCP context during the handover, including a single security context at any given point in time. This results in lower usage of radio resources and lower power consumption in the UE 102. This is also in line with the current modelling of handover, where the UE 102 only needs to have a single PDCP context per bearer at any point in time.

In some embodiments, after establishing the target radio connection 108 to the target access node 104, PDCP Packet Data Unit (PDU)s from the source access node 103, i.e. based on the old/previous security context, can still be decoded based on the old/previous security context.

In some embodiments, the provided solution does not require an explicit release request message to be sent from the target access node 104 to the UE 102.

In some embodiments, the UE 102 applies security context switching for uplink and downlink individually. This may further reduce the amount of UE 102 resources needed while still being able to receive packets from the source access node 103 and transmit packets to the target access node 104.

In some embodiments, the UE 102 applies security context switching for each bearer individually and possibly using different criteria for different bearers. This makes it possible to optimize the security context switching criteria for each type of bearer and free up resources as result.

Therefore embodiments herein provide an improved method for handling handover.

According to some first embodiments herein, a method performed in the UE 102 for handling a handover will be described with reference to FIG. 5. The method comprises one or more of the following actions.

Action 501

The UE 102 receives a handover command message from a source access node 103. The message includes parameters required for deriving a security context associated with the target access node 104. The parameters required for deriving a security context associated with the target access node 104 may in NR e.g. comprise the RRC information element masterKeyUpdate specified in 3GPP TS 38.331. The IE masterKeyUpdate includes the fields keySetChangeindicator, nextHopChainingCount, also known as NCC, and optionally nas-Container. Security context when used herein means the set of encryption and integrity protection keys used for user plane traffic and RRC signalling and associated counters.

The UE 102 may receive the handover command message from a source access node 103 on a source radio connection 107.

The message may also include information such as an indicator that instructs the UE 102 of the type of handover to be performed, for example an enhanced make-before-break indicator.

Action 502

The UE 102 establishes a target radio connection 108 with the target access node 104. At this point, downlink data packets arriving at the source access node 103 starts to be forwarded towards the UE 102 via the target access node 104. Forwarding of downlink data packets from the source access node 103 may also be started earlier, e.g. prior to step 501 when sending the Handover Command message from the source access node 103 to the UE 102 or right after sending the Handover Command to the UE 102. The source access node 103 typically also may send the same data packets to the UE 102 directly over the radio connection in the source cell. When the same data packets are sent to the UE 102 from both source and target, this is also known as bi-casting.

Action 503

The UE 102 checks whether security context switching criterion is fulfilled and detects that the security context switching criterion is fulfilled. Examples of security context switching criteria are given below.

Action 504

When the security context switching criterion is fulfilled, the UE 102 may start to use the security context associated with the target access node 104 and stops using the security context associated with the source access node 103. This means, for example, that all data packets transmitted from the UE 102 are ciphered by the PDCP layer using the encryption key associated with the security context associated with the target access node 104. It also means, for example, that all data packets received by the UE 102, are deciphered by the PDCP layer using the encryption key associated with the security context associated with the target access node 104, which also means that the UE 102 may stop receiving PDCP packets directly from the source access node 103 in the source cell.

First Data Packet Security Context Switching Criterion

One example of a security context switching criterion may be when the UE 102 receives a first data packet from the target access node 104 on the target radio connection 108.

An example of the "first data packet" a PDCP data PDU for a specific data radio bearer received at the PDCP layer, i.e. when it is to be deciphered.

In another example, the "first data packet" may be an RLC data PDU for a specific data radio bearer.

In one embodiment, the PDCP PDU or RLC PDU constituting the "first data packet" has a payload containing user plane data, i.e. any preceding PDCP PDU or RLC PDU with a payload consisting of only control plane data is not considered to be the "first data packet" triggering the switch of the security context.

In another embodiment the PDCP PDU or RLC PDU constituting the "first data packet" may contain either user plane data or control plane data or both.

Applying the New Security Context

When applying the new security context for deciphering on PDCP layer, in one embodiment the UE 102 applies the new security context for the PDCP PDU that triggered the security context switch and for all PDCP PDUs with higher or subsequent sequence numbers than the sequence number of the PDCP PDU that triggered the security context switch. With this embodiment, PDCP PDUs from the source access node 103, i.e. based on the old/previous security context, can still be decoded based on the old/previous security context.

In an alternative embodiment, the new security context may be applied for the PDCP PDU that triggered the security context switch unless the security context switch was triggered by an RLC PDU and for all PDCP PDUs received after the PDU that triggered the security context switch, regardless of their sequence numbers. In this alternative embodiment, out of order delivery by lower layers e.g. due to Hybrid Automatic Repeat Request (HARQ), Automatic Repeat Request (ARQ), among the PDCP PDUs received from the target access node 104, may be accounted for, i.e. this way, all PDCP PDUs from the target access node 104 are correctly decoded with the new security context. Decoding fails however for remaining PDUs from the source access node 103, i.e. those must be discarded. The target access node 104 ensures in this embodiment that all PDUs transmitted from the source access node 103, for which successful delivery had not been confirmed yet, are retransmitted from the target access node 104, this way ensuring that all data can be successfully decoded by the UE 102 after the security context switch.

In some embodiments, the UE 102 decrypts/deciphers all PDCP PDUs that are received out-of-order from the source access node 103 and are stored in re-ordering buffer of the source RLC entity using the source security context before applying the new security context. This may involve a re-establishment of the source RLC entity. Upon reception of the "first data packet", the UE 102 also starts using the new security context for UL packets, e.g. using the key(s) of the new security context for integrity protection and/or encryption/ciphering of the UL packets.

Alternative Security Context Switching Criterion

As an alternative example of a security context switching criterion, instead of a "first data packet" triggering the change of security context, a scheduling grant also known as UL grant received from the target access node 104, e.g. as response to the Random Access Preamble or as response to the message 3 (MSG3) of the random access procedure, may be used as the criterion.

Yet another alternative example of a security context switching criterion may be a MAC Control Element (CE) carried in a MAC PDU received by the UE 102 from the target access node 104. In this case, the UE 102 may switch for all radio bearers. An example of a MAC CE may be a MAC CE that confirms the reception of MSG3 in the random access procedure in the target cell, e.g. a UE Contention Resolution Identity MAC CE, or a Timing Advance MAC CE. In one example, the message 3 in the random access procedure may be a message from the UE indicating the completion of the handover, e.g. a Handover Complete message or an RRCReconfigurationComplete message or RRCConnectionReconfigurationComplete message serving the purpose of indicating the completion of the handover. In another example, the message 3 of the random access procedure may be a message containing a C-RNTI and an uplink Buffer Status Report (BSR) and/or a Power Headroom Report (PHR).

Yet another alternative example of a security context switching criterion may be reception of a MAC PDU containing a Random Access Response by the UE 102 from the target access node 104 that confirms the transmission of the Random Access Preamble of the random access procedure.

The switch may also be done per radio bearer if the radio bearer is indicated in the MAC PDU using e.g. a Logical Channel ID (LCID).

As yet another alternative example of a security context switching criterion, in case no downlink packets are to be sent to the UE 102, the target access node 104 sends a dummy packet to the UE 102, and reception of this dummy packet may be the security context switching criterion. An example of a dummy packet may be a PDCP data PDU or an RLC data PDU without any payload data or a PDCP control PDU or a RLC control PDU or a MAC CE. This may be seen as an extension of the embodiment where the first DL data packet in the target cell triggers the security context switch, where the dummy packet would constitute this first data packet. The purpose of this additional functionality is to handle situations where there are no DL data packets pending for transmission and then a dummy packet may be sent instead in order not to unnecessarily delay the security context switch.

As yet another alternative, the security context switching criterion may be when the UE 102 transmits the assigned Random Access Preamble in case the non-contention based random access procedure is configured.

In yet another alternative, the security context switching criterion may be when the UE 102 has sent MSG3 i.e. message 3 of the random access procedure to the target access node 104 or when the UE 102 has received a confirmation that that the MSG3 has been received by the target access node. In one example, the message 3 of the random access procedure may be a message from the UE indicating the completion of the handover, e.g. a Handover Complete message or an RRCReconfigurationComplete message or RRCConnectionReconfigurationComplete message serving the purpose of indicating the completion of the handover. In another example, the message 3 of the random access procedure may be a message containing a C-RNTI and an uplink Buffer Status Report and/or a Power Headroom Report (PHR).

In yet another alternative, the security context switching criterion may be when the UE 102 has sent the PDCP Status Report to the target access node 104 or when the UE 102 has received a confirmation that that the PDCP Status Report has been received by the target access node 104.

In yet another alternative, the security context switching criterion may be when the UE 102 has generated the PDCP Status Report to be sent to the target access node 104.

In yet another alternative, when any of the security context switching criteria described here is fulfilled, the UE 102 starts a timer, and when this timer expires, the UE 102 switches security context.

As already partly mentioned, all the above variants of security context switching criteria and the actions involved with each, except the ones related to the overall radio connection, may be applied per bearer or for all bearers together. In the form case, using the "first DL data packet" criterion as an example, this would mean that a received data packet triggers the UE to switch the security context only for the bearer the data packet was received on. In the latter case, using the same security context switch criterion example, the first received data packet, irrespective of the bearer it is received on, would trigger the UE to switch the security context for all its established bearers. Exceptions from this possibility of applying the security switch per bearer are the criteria that are non-bearer related, but rather related to the whole radio connection, e.g. when a MSG3 or a confirmation of MSG3 is used as the context switch criterion.

Subset of Security Context Switching Criterion

Yet another possibility may be to use a combination of any subset of the above criteria or all of the above criteria and combined them to a logic expression using Boolean algebra with Boolean OR in between, i.e. the security context may be switched if criterion-1 OR criterion-2 OR criterion-3 . . . is fulfilled, or using Boolean algebra with Boolean AND in between, or a combination of OR and AND. Another way of expressing this is, in the case of Boolean OR, that the UE 102 switches the security context when the first of criterion-1, criterion-2 and criterion-3 . . . is fulfilled. Again, this may be applied per bearer or for all bearers together. Note when apply the combination of the criteria, it may be seen as an actual criterion, i.e. the security switch criterion may be that either of "subcriterion-1", "subcriterion-2", "subcriterion-3" . . . etc. is fulfilled.

In another variation of embodiments herein, the UE 102 applies separate criteria for security context switch for the uplink (UL) and the downlink (DL). For instance, the security context switch criterion for the DL may be the reception of the first DL data packet in the target cell, while the security context switch criterion for the UL may be reception of an UL grant.

In another embodiment, the security context switching criterion to use or criteria in case multiple criteria are used, e.g. for UL and DL or for triggering security context switch for a bearer or the entire radio connection may be configurable. For instance, the network may instruct the UE 102 to use one or multiple of the above described criteria in the Handover Command message, also known as RRC Reconfiguration message in NR or RRCConnectionReconfiguration message in LTE. For example, this parameter may indicate which security context switch criterion, or set of security context switching criteria, to be used by the UE 102, among a given set of possible security context switching criteria. For example, this parameter may indicate whether the UE 102 shall wait for the first received data packet from the target access node 103, or when the UE 102 has sent a given message to the target access node 104. In another example, a value of a timer, may be used in conjunction with the security context switching criterion. The source of this configuration information can be the source access node 103, which may include it in the message, or the target access node 104, which may include it in the configuration data container passed to the source access node 103 in the Handover Request Acknowledge message and forwarded to the UE 102 by the source access node 103. Yet another possibility may be that the source access node 103 sends the security context switching criterion/criteria configuration to the target access node 104 in the Handover Request message and the target access node 104 includes it in the configuration data container passed to the source access node 103 in the Handover Request Acknowledge message which may be then forwarded to the UE 102 by the source access node 103.

Another possible means for configuration of the security context switching criterion/criteria may be that the configuration information is included in the system information that is broadcast or provided on-demand in the source cell.

As explained in section Mobility in RRC_CONNECTED in LTE and NR, the source access node 103 and the target access node 104 in the alternative solutions above refer to roles served by access nodes during handover of the UE 102. In some cases, such as intra-node handover or intra-cell handover, both roles of the source and target access nodes are served by the same access node.

Figure 6:
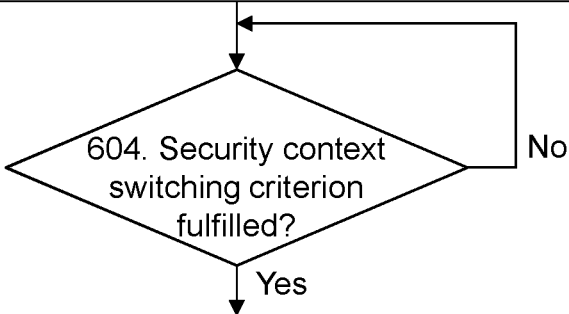
FIG. 6 is a flow chart illustrating a method performed in UE according to another embodiment herein.

According to some second embodiments herein, a method performed in the UE for handling a handover will be described with reference to FIG. 6. The method comprises the following actions.

The first two actions are the same as Action 501 and 502.

Action 601

The UE 102 receives a handover command message from a source access node 103. The handover command message includes parameters required for deriving a security context associated with the target access node 104. The handover command message from a source access node 103 may be received on the source radio connection 107.

Action 602

The UE 102 establishes a target radio connection 108 with the target access node 104.

Action 603

In this embodiment of the method, the UE 102 starts using the security context associated with the target access node 104 as soon as the target radio connection 108 is established with the target access node 104. The UE 102 keeps the security context associated with the source access node 103, until the security context switching criterion is fulfilled.

Action 604

The UE 102 then checks whether security context switching criterion is fulfilled and detects that the security context switching criterion is fulfilled. Examples of security context switching criteria are given below.

Action 605

The UE 102 stops using the security context associated with the source access node 103.

In these embodiments, i.e. the second embodiments of the method, the UE 102 may still receive and send packets with the source access node 103, but also with the target access node 104, even for the same bearer.

Figure 5:
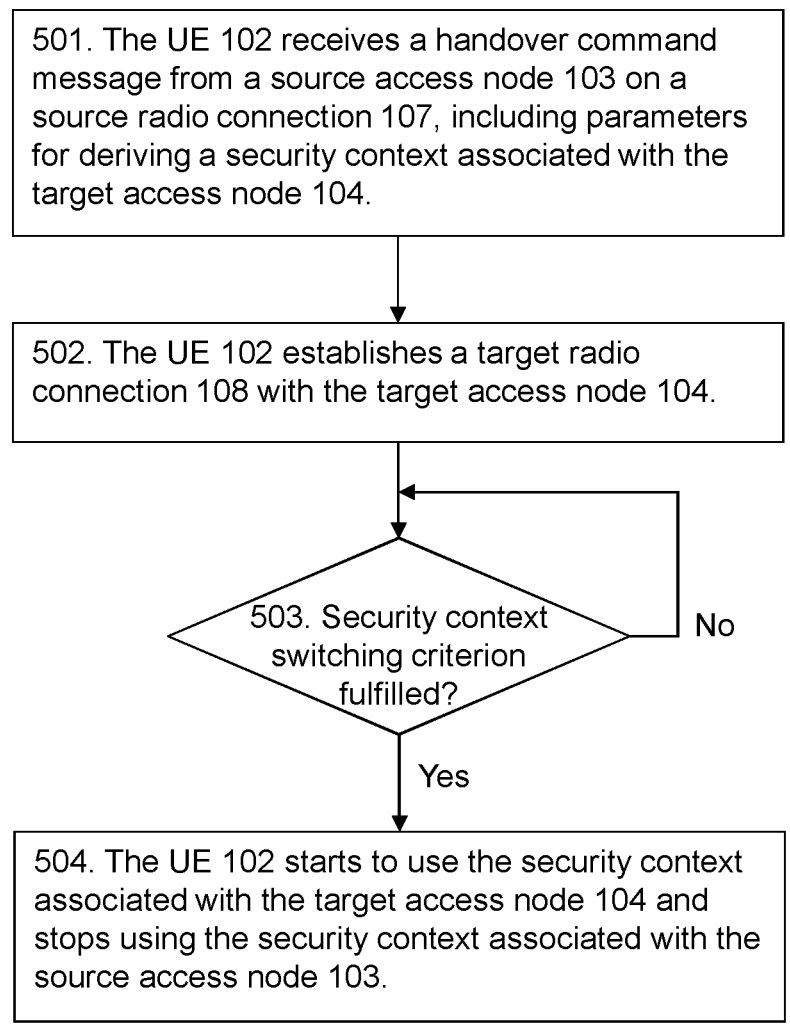
FIG. 5 is a flow chart illustrating a method performed in UE according to one embodiment herein.

In this embodiment, the security context switching criterion may be any of the security context switching criteria as described in the embodiments related to FIG. 5, referred to as the first embodiments.

Also, in this second embodiment, when applying the new security context for deciphering on PDCP layer, in one embodiment the UE 102 applies the new security context from all PDCP PDUs with higher/subsequent sequence numbers than the sequence number of the PDCP PDU that triggered the security context switch. With this embodiment, PDCP PDUs from the source access node 103, i.e. based on the old/previous security context, can still be decoded based on the old/previous context. In an alternative embodiment, the new security context may be applied for all PDCP PDUs received after the PDU that triggered the security context switch, regardless of their sequence number. In this alternative embodiment, out of order delivery by lower layers e.g. due to HARQ, ARQ among the PDCP PDUs received from the target access node 104, may be accounted for, i.e. this way, all PDCP PDUs from the target access node 104 are correctly decoded with the new security context. Decoding fails however for remaining PDUs from the source access node 103, i.e. those must be discarded. The target access node 104 ensures in this embodiment that all PDUs transmitted from the source access node 103, for which successful delivery had not been confirmed yet, are retransmitted from the target access node 104, this way ensuring that all data can be successfully decoded by the UE 102 after the security context switch. In some embodiments, the UE 102 decrypts all PDCP PDUs that are received out-of-order from the source access node 103 and are stored in re-ordering buffer of the source RLC entity using the source security context before applying the new security context. This may involve a re-establishment of the source RLC entity.

According to some third embodiments, a method performed in the UE 102 for handling a handover will be described with reference to FIG. 7. The method comprises the following actions. In these third embodiments, the security context switching criterion comprises a first security context switching criterion and a second security context switching criterion. This will be described more in detail below.

The first two actions are the same as Action 501 and 502.

Action 701

The UE 102 receives a handover command message from a source access node 103. The handover command message includes parameters required for deriving a security context associated with the target access node 104. The handover command message from a source access node 103 may be received on the source radio connection 107.

Action 702

The UE 102 establishes a target radio connection 108 with the target access node 104.

Action 703

After establishing the target radio connection 108 with the target access node 104, the UE 102 monitors whether a first security context switching criterion is fulfilled for any of the bearers and detects that the first security context switching criterion is fulfilled. Examples of security context switching criteria are given below.

Action 704

If this is the case, the UE 102 may switch security context, i.e. starts using the security context associated with the target access node 104 and stops using the security context associated with the source access node 103, for that bearer for which the first security context switching criterion was fulfilled.

In some embodiments, the UE 102 starts to use the security context associated with the target access node 104 for a first bearer in response to the first security context switching criterion being fulfilled for the first bearer.

Action 705

The UE 102 checks whether a second security context switching criterion is fulfilled and detects that the first security context switching criterion is fulfilled.

Action 706

If that is the case, the UE 102 switches the security context for all remaining bearers, i.e. the bearers for which the security context has not been switched in Action 704. If not, the UE 102 may go back to Action 703 and check whether the first security context switching criterion is fulfilled for any of the remaining bearers.

In some embodiments, the UE 102 starts to use the security context associated with the target access node 104 for a second bearer in response to the second security context switching criterion being fulfilled for the second bearer.

In some embodiments, the UE 102 starts to use the security context associated with the target access node 104 for all bearers in response to the second security context switching criterion being fulfilled.

In some of these third embodiments, the UE 102 detects a first security context switching criterion independently for each bearer, and this first security context switching criterion triggers the switch of security context for the given bearer, Then, the UE applies a second security context switching criterion to trigger the security context switches for the remaining bearers for which a switch did not take place yet using the first security context switching criterion.

In some of these third embodiments, the first security context switching criterion may be one of the security context switching criteria as described in the first embodiment, e.g. that the UE 102 receives a packet, such as an RLC or PDCP PDU from the target access node 104 using the target radio connection 108, associated with the bearer. Another example of a first security context switching criterion may be reception of a MAC PDU, for which the radio bearer is indicated in the MAC PDU, e.g. using a Logical Channel ID (LCID).

The second security context switching criterion may be one of the security context switching criteria as described in the first embodiment, for example when the UE 102 receives a MAC Control element (MAC CE) from the target access node 104. Another example of the second security context switching criterion may be when the UE 102 detects that the source radio connection 107 has failed, as part of e.g. RLM function. As yet additional example of the second security context switching criterion may be when the UE 102 receives a certain message from the target radio access node 108.

Also, in some of these third embodiments, when applying the new security context for deciphering on PDCP layer, in one embodiment the UE 102 applies the new security context from all PDCP PDUs with higher/subsequent sequence numbers than the sequence number of the PDCP PDU that triggered the security context switch. With this embodiment, PDCP PDUs from the source access node 103, i.e. based on the old/previous security context, can still be decoded based on the old/previous context. In an alternative embodiment, the new security context may be applied for all PDCP PDUs received after the PDU that triggered the switch, regardless of their sequence number. In this alternative embodiment, out of order delivery by lower layers e.g. due to HARQ, ARQ, among the PDCP PDUs received from the target access node 104, may be accounted for, i.e. this way, all PDCP PDUs from the target access node 104 are correctly decoded with the new security context. Decoding fails however for remaining PDUs from the source access node 103, i.e. those must be discarded. The target access node 104 ensures in this embodiment that all PDUs transmitted from the source access node 103, for which successful delivery had not been confirmed yet, are retransmitted from the target access node 104, this way ensuring that all data can be successfully decoded by the UE 102 after the security context switch. In some embodiments, the UE 102 decrypts all PDCP PDUs that are received out-of-order from the source access node 103 and are stored in re-ordering buffer of the source RLC entity using the source security context before applying the new security context. This may involve a re-establishment of the source RLC entity.

In some of these third embodiments, for signaling radio bearers, such as SRB1 and SRB2, as an example of the first security context switching criterion, may be when the UE 102 has received and processed the handover command message, in NR also known as RRCReconfiguration message and in LTE as RRCConnectionReconfiguration message, received from the source access node 103 or when it sends the handover complete message, in NR also known as the RRCReconfigurationComplete message and in LTE as RRCConnectionReconfigurationComplete message, to the target access node 104.

In yet another alternative, the first security context switching criterion for a given radio bearer may be defined and detected in the uplink and downlink independently. As a first security context switching criterion for the downlink security context, which includes the key used to decipher received downlink data packets, may be when the UE 102 has received a first downlink data packet from the target access node 104. In another example of a first security context switching criterion for the downlink may be the reception of a scheduling grant, or at reception of a MAC PDU from the target access node 104 by the UE 102, or when the UE 102 detects confirmation that the Handover Complete message has been received by the target access node 104. One example of such a confirmation may be indication from the RLC layer about RLC acknowledgement for the RLC Service Data Unit (SDU) in which the Handover Complete was sent.

In yet another alternative, the first security context switching criterion may be defined independently for each bearer. In other words, a first bearer may use one type of security context switching criterion and a second bearer another type of security context switching criterion. In this alternative, if the criterion is configurable, in a similar way as described in the first embodiment, the network may configure a criterion for each bearer.

As a first security context switching criterion for the uplink security context, for example the key used to cipher transmitted uplink data packets, may be when the UE 102 needs to send the first uplink data packet to the target access node 104. As another example of the first security context switching criterion for the uplink security context, may be the reception of the handover command message from the source access node 103 or the transmission of the handover complete message to the target access node 104. A result of decoupling the uplink and downlink direction is that there may be a short period when the UE applies different security contexts for the downlink and uplink direction for a radio bearer. For example the target security context may be applied for the UL direction while the source security context may be applied for the downlink direction. In yet another alternative, the UE 102 may start a timer, e.g. in Action 702, or when the first security context switching criterion is fulfilled for the first bearer. The timer may in the latter case be started in Action 704. The second security context switching criterion may be when this timer expires. In yet another alternative, the second security context switching criterion ay be when the UE 102 has switched security context for all bearers using the first security context switching criterion. In this alternative, Action 706 may be omitted since there are no remaining bearers for which a switch did not take place yet using the first security context switching criterion.

Below some embodiments 1-13 are described.

Embodiment 1 A method performed in a UE 102 for handling handover from a source access node 103 to a target access node 104, comprising:
  receiving a handover command message from the source access node 103; wherein the handover command message includes parameters required for deriving a security context associated with the target access node 104;
  establishing a radio connection with the target access node 104;
  detecting if a security context switching criterion is fulfilled.

Embodiment 2 The method according to Embodiment 1, further comprising starts using the security contexts associated with both the target access node 104 and the source access node 103 after establishing a radio connection with the target access node 104.

Embodiment 3 The method according to Embodiment 1, wherein in response to the security context switching criterion being fulfilled, the UE 102 starts using the security context associated with the target access node 104.

Embodiment 4 The method according to Embodiment 1, wherein in response to the security context switching criterion being fulfilled, the UE 102 stops using the security context associated with the source access node 103.

Embodiment 5 The method according to Embodiments 1-4, wherein the security context switching criterion is configurable and is any one of or a combination of:
  a. Reception of a user plane data packet from the target access node 104;
  b. Reception of a control plane data packet from the target access node 104;
  c. Reception of an UL grant from the target access node 104;
  d. Reception of a MAC CE or PDU from the target access node 104;

e. A confirmation message transmitted to the target access node 104 to indicate completion of the handover;
f. Reception of a dummy packet from the target access node 104;
g. when the UE 102 has generated a PDCP Status Report to be sent to the target access node 104;
h. when the UE 102 has sent the PDCP Status Report to the target access node 104 or when the UE 102 has received a confirmation that the PDCP Status Report has been received by the target access node 104;
i. when the UE 102 has sent a MSG3 to the target access node 104 or when the UE 102 has received a confirmation that the MSG3 has been received by the target access node 104;
j. when the UE 102 transmits an assigned Random Access Preamble in case the non-contention based random access procedure is configured.

Embodiment 6 A method performed in a UE 102 for handling handover from a source access node 103 to a target access node 104, comprising:
receiving a handover command message from the source access node 103, wherein the handover command message includes parameters required for deriving a security context associated with the target access node 104;
establishing a radio connection with the target access node 104;
detecting if a first security context switching criterion is fulfilled;
detecting if a second security context switching criterion is fulfilled.

Embodiment 7 The method according to Embodiment 6, wherein in response to the first security context switching criterion being fulfilled for a first bearer, the UE 102 starts using the security context associated with the target access node 104 for the first bearer.

Embodiment 8 The method according to Embodiment 6 or 7, wherein in response to the first security context switching criterion being fulfilled for a second bearer, the UE 102 starts using the security context associated with the target access node 104 for the second bearer.

Embodiment 9 The method according to Embodiment 6, 7 or 8, wherein in response to the second security context switching criterion being fulfilled, the UE 102 starts using the security context associated with the target access node 104 for all bearers.

Embodiment 10 The method according to any one of Embodiments 1-9, further comprising:
receiving from the source access node 103 configuration data for instructing the UE 102 to apply one or subset out of a set of criterion for triggering switch of security context;
switching security context in accordance with the received configuration data upon fulfillment of the configured criteria or criterion.

Embodiment 11 The method according to any one of Embodiments 1-10, wherein detecting if a security context switching criterion is fulfilled is performed for UL and DL independently with different switching criterion and switching security context is performed separately for the UL and the DL.

Embodiment 12 A method performed in a network node for assisting a UE to handover from a source access node 103 to a target access node 104 comprising:
sending a message to the UE comprising configuration data for instructing the UE 102 to apply one or subset out of a set of criterion for triggering switch of security context.

Embodiment 13 The method of Embodiment 12, wherein the network node is a source access node 103 or a target access node 104.

Figure 8:
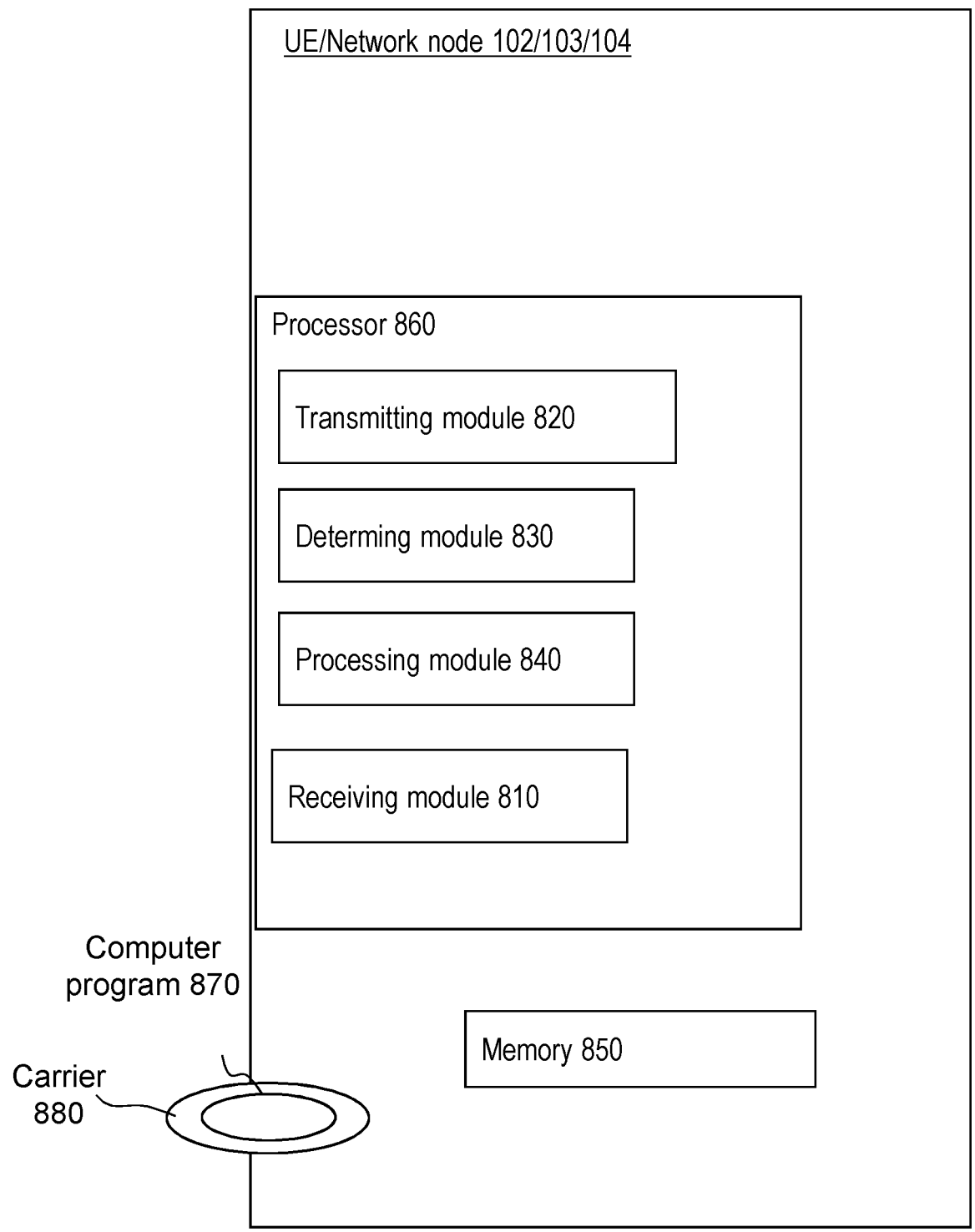
FIG. 8 is a schematic block diagram illustrating one embodiment of a UE or network node.

To perform the method in the UE 102, network node 103, 104, the UE, network node comprises modules as shown in FIG. 8. The network node comprises a receiving module 810, a transmitting module 820, a determining module 830, a processing module 840, a memory 850 etc. The receiving module 810, transmitting module 820, determining module 830 and processing module 840 may be combined as one module, shown as processor 860.

The UE 102 is configured to, e.g. by means of the receiving module 810, receive a handover command message from the source access node 103; wherein the handover command message is adapted to include parameters required for deriving a security context associated with the target access node 104.

The UE 102 is further configured to, e.g. by means of the processing module 840, establish a radio connection with the target access node 104.

The UE 102 is further configured to, e.g. by means of the processing module 840, when detecting that a security context switching criterion is fulfilled, stop to use a security context associated with the source access node 103.

The UE 102 is further configured to, e.g. by means of the processing module 840, start to use the security contexts associated with both the target access node 104 and the source access node 103 after establishing a radio connection with the target access node 104.

The UE 102 may further configured to, e.g. by means of the processing module 840, start to use the security context associated with the target access node 104 in response to the security context switching criterion being fulfilled.

In some embodiments, the security context switching criterion is configurable and is any one of or a combination of:
a. a reception of a user plane data packet from the target access node 104;
b. a reception of a control plane data packet from the target access node 104;
c. a reception of an UL grant from the target access node 104;
d. a reception of a Media Access Control Element, MAC CE, or Packet Data Unit, PDU, from the target access node 104;
e. a confirmation message transmitted to the target access node 104 to indicate completion of the handover;
f. a reception of a dummy packet from the target access node 104;
g. when the UE 102 has generated a Packet Data Convergence Protocol, PDCP, Status Report to be sent to the target access node 104;
h. when the UE 102 has sent the PDCP Status Report to the target access node 104 or when the UE 102 has received a confirmation that the PDCP Status Report has been received by the target access node 104;
i. when the UE 102 has sent a message 3, MSG3, to the target access node 104 or when the UE 102 has received a confirmation that the MSG3 has been received by the target access node 104;
j. when the UE 102 transmits an assigned Random Access Preamble in case the non-contention based random access procedure is configured.

The UE 102 may further configured to, e.g. by means of the processing module 840, start to use the security context associated with the target access node 104 for a first bearer in response to the security context switching criterion being fulfilled for the first bearer.

The UE 102 may further configured to, e.g. by means of the processing module 840, start to use the security context associated with the target access node 104 for a second bearer in response to the second security context switching criterion being fulfilled for a second bearer.

The UE 102 may further configured to, e.g. by means of the processing module 840, start to use the security context associated with the target access node 104 for all bearers in response to a second security context switching criterion being fulfilled.

The UE 102 may further configured to, e.g. by means of the receiving module 810, receive from the source access node 103 configuration data for instructing the UE 102 to apply one or subset out of a set of criterion for triggering switch of security context; and The UE 102 may further configured to, e.g. by means of the processing module 840, switch security context in accordance with the received configuration data upon fulfilment of the configured criteria or criterion.

The UE 102 may further configured to, e.g. by means of the processing module 840, detect if a security context switching criterion is fulfilled by performing for UL and DL independently with different switching criterion, and wherein switching security context is performed separately for the UL and the DL.

The method according to embodiments herein may be implemented through one or more processors, such as the processor 860 in the UE 102, network node 103, 104 together with computer program code for performing the functions and actions of the embodiments herein. The program code mentioned above may also be provided as a computer program product, for instance in the form of a data carrier 880 carrying computer program code 871, as shown in FIG. 8, for performing the embodiments herein when being loaded into the UE 102, network node 103, 104. One such carrier may be in the form of a CD ROM disc. It is however feasible with other data carriers such as a memory stick. The computer program code may furthermore be provided as pure program code on a server or a cloud and downloaded to the UE 102, network node 103, 104.

The memory 850 in the UE 102, network node 103, 104 may comprise one or more memory units and may be arranged to be used to store received information, measurements, data, configurations and applications to perform the method herein when being executed in the UE 102, network node 103, 104.

At least some of the following abbreviations may be used in this disclosure. If there is an inconsistency between abbreviations, preference should be given to how it is used above. If listed multiple times below, the first listing should be preferred over any subsequent listing(s).

Abbreviation Explanation
5GS 5G System
5GC 5G Core network
AMF Access and Mobility Management Function
CHO Conditional Handover
C-RNTI Cell RNTI
DL Downlink
eNB Evolved Node B
eMBB Enchanced Make-before-break
E-UTRAN Evolved Universal Terrestrial Access Network
EPC Evolved Packet Core network
gNB 5G Node B
HO Handover
IE Information Element
LTE Long-Term Evolution
MAC Medium Access Control
MBB Make-before-break
NCC Next Hop Chaining Counter
NG-RAN Next Generation Radio Access Network
NR New Radio
PDCP Packet Data Convergence Protocol
PDU Protocol Data Unit
PHY Physical Layer
RA Random Access
RAR Random Access Response
RAT Radio Access Technology
RLC Radio Link Control
RNTI Radio Network Temporary Identifier
RRC Radio Resource Control
Rx Receive

The invention claimed is:

1. A method performed in a User Equipment, UE, for handling handover from a source access node to a target access node, comprising:
    receiving a handover command message from the source access node; wherein the handover command message includes parameters required for deriving a security context associated with the target access node;
    establishing a radio connection with the target access node;
    when detecting that a security context switching criterion is fulfilled, stopping to use a security context associated with the source access node, wherein detecting that the security context switching criterion is fulfilled comprises detecting that a control plane data packet on a target radio connection is received from the target access node,
    wherein the security context switching criterion is configurable and comprises a criterion indicating when the UE has sent a message 3, MSG3, to the target access node.

2. The method according to claim 1, further comprising: starting to use the security contexts associated with both the target access node and the source access node after establishing the radio connection with the target access node.

3. The method according to claim 1, further comprising: starting to use the security context associated with the target access node in response to the security context switching criterion being fulfilled.

4. The method according to claim 1, wherein the security context switching criterion further comprises any one of or a combination of:
    a reception of a user plane data packet from the target access node;
    a reception of a control plane data packet from the target access node;
    a reception of an UL grant from the target access node;
    a reception of a Media Access Control Element, MAC CE, or Packet Data Unit, PDU, from the target access node;
    a confirmation message transmitted to the target access node to indicate completion of the handover;
    a reception of a dummy packet from the target access node;
    when the UE has sent the PDCP Status Report to the target access node or when the UE has received a confirmation that the PDCP Status Report has been received by the target access node;
    when the UE has received a confirmation that the MSG3 has been received by the target access node;

when the UE transmits an assigned Random Access Preamble in case the non-contention based random access procedure is configured.

5. The method according to claim 1, wherein the security context switching criterion comprises a first security context switching criterion, the method further comprising:
starting to use the security context associated with the target access node for a first bearer in response to the security context switching criterion being fulfilled for the first bearer.

6. The method according to claim 1, wherein the security context switching criterion comprises a second security context switching criterion, the method further comprising:
starting to use the security context associated with the target access node for a second bearer in response to the second security context switching criterion being fulfilled for the second bearer.

7. The method according to claim 1, wherein the security context switching criterion comprises a second security context switching criterion, the method further comprising:
starting to use the security context associated with the target access node for all bearers in response to the second security context switching criterion being fulfilled.

8. The method according to claim 1, further comprising:
receiving from the source access node configuration data for instructing the UE to apply one or subset out of a set of criteria for triggering switch of security context; and
switching security context in accordance with the received configuration data upon fulfillment of the configured criteria or criterion.

9. The method according to claim 1, wherein the method further comprises detecting if a security context switching criterion is fulfilled by performing for UL and DL independently with different switching criterion, and wherein switching security context is performed separately for the UL and the DL.

10. A non-transitory computer-readable medium comprising instructions, which when executed by a processor, causes the processor to perform actions according to claim 1.

11. A method performed in a network node for assisting a User Equipment, UE, to handover from a source access node to a target access node comprising:
sending a message to the UE comprising configuration data for instructing the UE to apply one or subset out of a set of criteria for triggering switch of security context, wherein in response to sending the message, a security context switching criterion is fulfilled, the security context switching criterion comprises a reception of a control plane data packet on a target radio connection by the UE from the target access node, wherein the security context switching criterion is configurable and comprises a criterion indicating when the UE has sent a message 3, MSG3, to the target access node.

12. The method of claim 11, wherein the network node is the source access node or the target access node.

13. A non-transitory computer-readable medium comprising instructions, which when executed by a processor, causes the processor to perform actions according to claim 11.

14. A User Equipment, UE, for handling handover from a source access node to a target access node, the UE being configured to:
receive a handover command message from the source access node; wherein the handover command message is adapted to include parameters required for deriving a security context associated with the target access node;
establish a radio connection with the target access node;
when detecting that a security context switching criterion is fulfilled, stop to use a security context associated with the source access node, wherein detecting that the security context switching criterion is fulfilled comprises detecting that a control plane data packet on a target radio connection is received from the target access node,
wherein the security context switching criterion is configurable and comprises a criterion indicating when the UE has sent a message 3, MSG3, to the target access node.

15. The method according to claim 14, further being configured to: start to use the security contexts associated with both the target access node and the source access node after establishing the radio connection with the target access node.

16. The UE according to claim 14, further being configured to:
start to use the security context associated with the target access node in response to the security context switching criterion being fulfilled.

17. The UE according to claim 14, wherein the security context switching criterion further comprises any one of or a combination of:
a reception of a user plane data packet from the target access node;
a reception of a control plane data packet from the target access node;
a reception of an UL grant from the target access node;
a reception of a Media Access Control Element, MAC CE, or Packet Data Unit, PDU, from the target access node;
a confirmation message transmitted to the target access node to indicate completion of the handover;
a reception of a dummy packet from the target access node;
when the UE has sent the PDCP Status Report to the target access node or when the UE has received a confirmation that the PDCP Status Report has been received by the target access node;
when the UE has received a confirmation that the MSG3 has been received by the target access node;
when the UE transmits an assigned Random Access Preamble in case the non-contention based random access procedure is configured.

18. The UE according to claim 14, further being configured to:
start to use the security context associated with the target access node for a first bearer in response to the security context switching criterion being fulfilled for the first bearer.

19. The UE according to claim 14, further being configured to,
start to use the security context associated with the target access node for a second bearer in response to the second security context switching criterion being fulfilled for the second bearer.

20. The UE according to claim 14, further being configured to:
start to use the security context associated with the target access node for all bearers in response to a second security context switching criterion being fulfilled.

21. The UE according to claim 14, further being configured to:
- receive from the source access node configuration data for instructing the UE to apply one or subset out of a set of criteria for triggering switch of security context; and
- switch security context in accordance with the received configuration data upon fulfillment of the configured criteria or criterion.

22. The UE according to claim 14, wherein the UE further is configured to detect if a security context switching criterion is fulfilled by performing for UL and DL independently with different switching criterion, and wherein switching security context is performed separately for the UL and the DL.

23. A network node for assisting a User Equipment, UE, to handover from a source access node to a target access node, the network node being configured to:
- send a message to the UE comprising configuration data for instructing the UE to apply one or subset out of a set of criterion for triggering switch of security context, wherein in response to the message being sent, a security context switching criterion is fulfilled, the security context switching criterion comprises a reception of a control plane data packet on a target radio connection by the UE from the target access node, wherein the security context switching criterion is configurable and comprises a criterion indicating when the UE has sent a message 3, MSG3, to the target access node.

24. The network node of claim 23, wherein the network node is the source access node or the target access node.

* * * * *